United States Patent [19]
Lee

[11] Patent Number: 5,712,451
[45] Date of Patent: Jan. 27, 1998

[54] DEVICE FOR SENSING FOOD WEIGHT IN A MICROWAVE OVEN

[75] Inventor: Jong Cheol Lee, Incheon, Rep. of Korea

[73] Assignee: Daewoo Electronics Co., Ltd., Seoul, Rep. of Korea

[21] Appl. No.: 462,288

[22] Filed: Jun. 5, 1995

[30] Foreign Application Priority Data

Jul. 25, 1994 [KR] Rep. of Korea ............. 94-17988

[51] Int. Cl.⁶ .............. G01G 3/14; H05B 1/02; H05B 6/50
[52] U.S. Cl. .............. 177/210 C; 177/210 C; 217/708; 217/518; 217/509
[58] Field of Search ............. 219/708, 518, 219/509; 177/210 C, 210 R

[56] References Cited

U.S. PATENT DOCUMENTS

| | | | |
|---|---|---|---|
| 4,214,151 | 7/1980 | Kicherer et al. | 219/509 |
| 4,683,967 | 8/1987 | Hanatani et al. | 177/210 R |
| 5,302,792 | 4/1994 | No et al. | 219/754 |
| 5,349,138 | 9/1994 | Dong | 177/144 |
| 5,369,254 | 11/1994 | Kwon | 219/708 |
| 5,422,464 | 6/1995 | Jeon | 219/708 |
| 5,565,655 | 10/1996 | Jeon | 177/245 |

FOREIGN PATENT DOCUMENTS

| | | |
|---|---|---|
| A-0-299395 | 1/1989 | European Pat. Off. . |
| A-0-302396 | 2/1989 | European Pat. Off. . |
| A-2-166551 | 5/1986 | United Kingdom . |

Primary Examiner—Michael L. Gellner
Assistant Examiner—Anh Mai
Attorney, Agent, or Firm—Oliff & Berridge

[57] ABSTRACT

A device for sensing food weight in a microwave oven includes a bracket formed into one body and mounted with a motor assembly having a motor axis, a movable electrode plate fixed to an extending piece separated from the bottom of the bracket and a printed circuit board in which a fixed electrode plate is printed. The printed circuit board is inserted in a space formed between the bottom of the bracket and the movable electrode plate. An initial food weight is set by varying an overlapping area of the movable electrode plate and the fixed electrode plate. The food weight is sensed by using the distance variation between the movable electrode plate and the fixed electrode plate. Since no weight is applied to the printed circuit board, the deformation and the destruction of the printed circuit board is prevented. Further, the distance between the fixed electrode plate and the movable electrode plate may be maintained constantly.

11 Claims, 4 Drawing Sheets

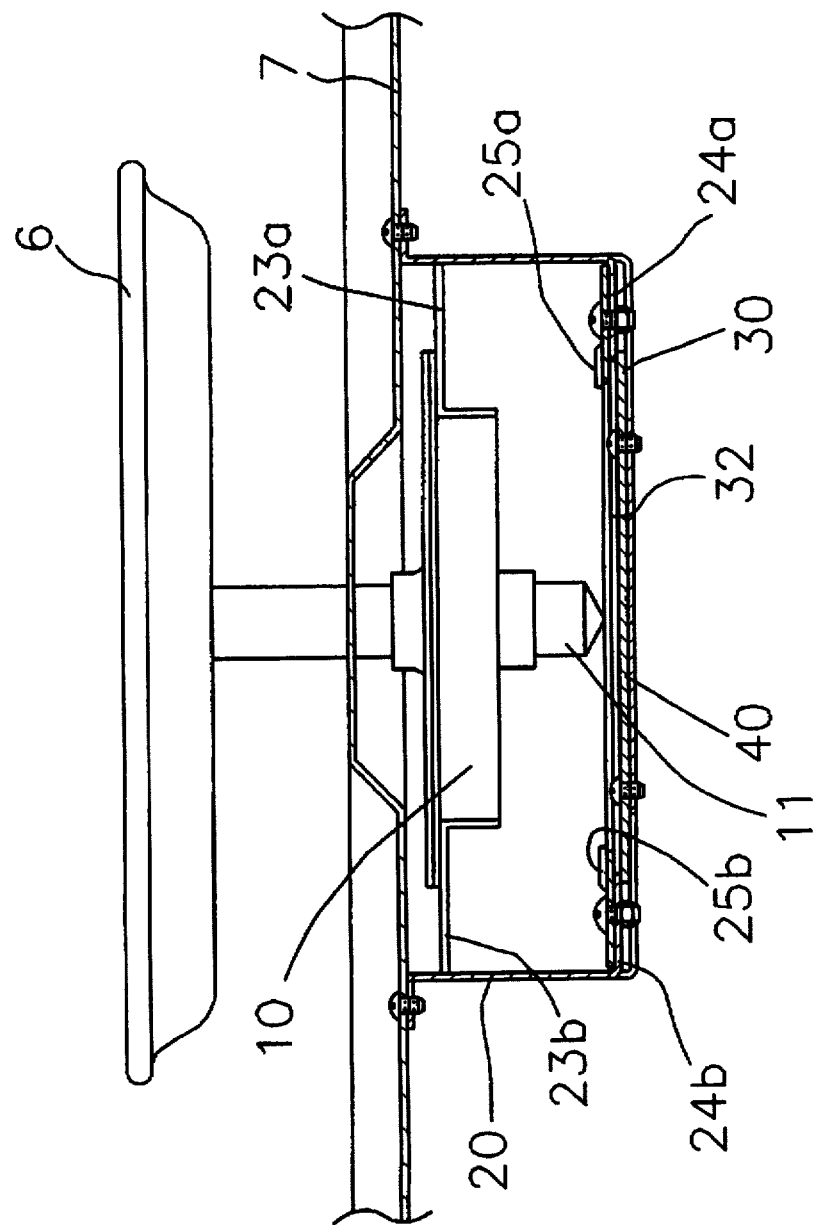

DEVICE FOR SENSING FOOD WEIGHT IN A MICROWAVE OVEN

BACKGROUND OF THE INVENTION

1. Field of the Invention

The present invention relates to a device for sensing a food weight in a microwave oven, and particularly to a device for sensing a food weight in a microwave oven wherein a capacitance method is utilized.

2. Description of the Prior Art

Generally, a microwave oven is an appliance for cooking foods using a microwave. The microwave is radiated from a magnetron to expose the food in a cooking room for cooking. The intensity and exposure time of the microwave is adjusted by the weight of the object food.

As for methods for sensing the food weight, a method utilizing piezoelectric elements and a method utilizing a capacitance between a fixed electrode plate and a movable electrode plate may be illustrated. Currently, food weight sensing devices employing such methods are used in various microwave ovens.

In a microwave oven utilizing the capacitance method, the capacitance varies according to the food weight. In proportion to the intensity of a high frequency, that is, the strength of the high frequency according to the variation of the capacitance, a microcomputer adjusts the intensity and the exposure time of the microwave to cook appropriately through the microwave exposure. Therefore, the sensing of the food weight is the most important thing in order to cook the food appropriately.

The conventional capacitance-type weight sensing device is provided with a fixed electrode plate which is printed in a printed circuit board (PCB) including a control circuit wherein a resistance-condenser (R-C) oscillating circuit is applied, and a movable electrode plate manufactured by using a plate spring of which position changes according to the food weight. The distance variation between the two electrode plates induces the capacitance variation between the electrode plates. At this time, a frequency of the high frequency varies according to the capacitance variation between the fixed electrode plate and the movable electrode plate. The microcomputer senses the frequency of the changed high frequency and reads out the food weight corresponding to the sensed frequency from a previously prepared look-up table. Then the microcomputer controls the microwave intensity and the cooking time in line with the food weight. The food weight in such a microwave oven is detected utilizing the following equation (1):

$$C \propto \epsilon A/d \quad (1)$$

wherein, C represents the capacitance, $\epsilon$ represents a dielectric constant of air, A represents the overlapping area of the electrode plates and d represents the distance between the electrode plates.

As shown in equation (1), when the overlapping area A is constant, the capacitance C is inversely proportional to the distance d between the fixed electrode plate and the movable electrode plate, while when the distance d is constant, the capacitance C is proportional to the overlapping area A between the fixed electrode plate and the movable electrode plate. That is, when the distance d becomes shorter and the overlapping area A becomes wider, the capacitance C increases.

As for methods for measuring the food weight in the conventional microwave oven employing the capacitance method, a method utilizing a distance variation and a method utilizing an overlapping area variation between the fixed electrode plate and the movable electrode plate may be used.

U.S. Pat. No. 5,349,138 (issued to Eun S. Dong) discloses a food weight sensing device utilizing the overlapping area variation. In the above food weight sensing device, when a food object to be cooked is placed on a tray of the microwave oven, a supporting bracket is lowered along with the movable electrode plate. Thus, the overlapping area between the movable electrode plate and the fixed electrode plate is reduced. Due to such a variation, the capacitance C is varied. A microcomputer reads the food weight according to the capacitance variation to thereby sense the food weight.

In the meantime, the device for sensing the food weight in the microwave oven utilizing the distance variation will be described in detail with reference to the attached FIG. 1.

FIG. 1 is a cross-sectional view of the device for sensing the food weight of the conventional microwave oven utilizing the distance variation between the fixed electrode plate and the movable electrode plate.

As illustrated in FIG. 1, the device for sensing the food weight of the conventional microwave oven includes a bracket 2 assembled with a motor 1 having a motor axis 1a which is provided to transfer the weight of the food which is placed on a tray 6, a movable electrode plate 3 provided with an elastic supporting piece 3a to receive the food weight from motor axis 1a and positioned under motor 1, a fixed electrode plate 5 spaced apart under movable electrode plate 3 while maintaining a constant distance d and the center portion thereof being supported by a screw 8 with a predetermined distance from the bottom of bracket 2, and spacers 4 for maintaining the distance d between movable electrode plate 3 and fixed electrode plate 5.

Hereinafter, the operation of the conventional device for sensing the food weight as described above will be explained.

Firstly, the distance d between fixed electrode plate 5 and movable electrode plate 3 is adjusted by using screw 8 to set the initial weight. The initial weight corresponds to the weight of an empty tray without any food, i.e., to that when the food weight is zero.

After setting the initial weight, elastic supporting piece 3a is bent due to the food weight on tray 6 so that the distance d between movable electrode plate 3 and fixed electrode plate 5 changes. That is, the capacitance C between the two electrode plates 3 and 5 changes (see equation (1)). At this time, the frequency of the high frequency changes according to the change of the capacitance C. The microcomputer (not shown) senses the changed frequency and reads the corresponding food weight from the previously prepared look-up table. The microcomputer radiates microwave with an appropriate intensity for an appropriate time suitable for cooking according to the sensed food weight.

However, the food weight which is the factor for bending the elastic supporting piece 3a acts as a force to pressurize the PCB and a repulsive force opposed to this force is generated at the center portion of the PCB which is supported by screw 8. As a result, the PCB is deformed into a shape having a convex center portion due to the forces applied in this manner. Repeated generation of the PCB deformation results in a variation of the initially set distance d between the electrode plates 3 and 5. That is, the initial weight when no food is placed on the tray 6 obviates from zero.

As described above, repeated use of the device for sensing the food weight of the conventional microwave oven induces the variation of the initially set distance d and a problem of difficult detection of the accurate food weight occurs. Moreover, PCB might be destroyed after repeated deformation.

SUMMARY OF THE INVENTION

Accordingly, an object of the present invention is to provide a device for sensing food weight in a microwave oven, which sets the initial weight utilizing an overlapping area between a fixed electrode plate and a movable electrode plate and which keeps the initial distance between the fixed electrode plate and the movable electrode plate constant and therefore senses the food weight accurately after repeated use of the microwave oven.

To accomplish the above object of the present invention, there is provided a device for sensing food weight in a microwave oven, the device comprising:

- a bracket provided with two side walls and a bottom, a front side and a rear side of the bracket being opened;
- a motor assembly having a motor axis for supporting and rotating a tray for placing a food, the motor assembly being mounted on the bracket;
- a movable electrode plate fixed to the bracket below the motor assembly to be in contact with the motor axis, the movable electrode plate having an elastic supporting piece which descends by a lowering force due to a weight of the food; and
- a fixed electrode plate printed in a rear portion of a printed circuit board, the printed circuit board being slidably inserted between the movable electrode plate and the bottom of the bracket to set an initial weight.

According to one embodiment of the present invention, the bracket is provided with first extending pieces extended from upper and rear portions of both side walls of the bracket, and the motor assembly is mounted on the first extending pieces. The bracket is provided with second extending pieces extended from front and lower portions of the side walls, the second extending pieces are vertically higher than the bottom of the bracket, and the movable electrode plate is fixed to the second extending pieces. The bracket is provided with guides bent at a rear portion of the bottom, for guiding the printed circuit board. The bracket is further provided with shoulders extended from upper portions of the side walls of the bracket and a housing of a microwave body is combined with the shoulders.

The movable electrode plate is provided with a body and the elastic supporting piece formed in a region from a center portion to a rear portion of the body. The printed circuit board is provided with longitudinal holes at both sides from a center thereof, and the overlapping area is adjusted by sliding the printed circuit board at a state that screws are inserted in the longitudinal holes.

In the device for sensing food weight in the microwave oven according to the present invention, if the PCB slides back and forth centering around a bolt inserted in the longitudinal hole of the PCB, the overlapping area between the fixed electrode plate and the movable electrode plate changes. Accordingly, the capacitance changes. At this time, the overlapping area is adjusted to the initial weight of zero and the PCB is fixed to the bracket by tightening up the bolt passing through the longitudinal hole. Thus, the initial weight is set.

After setting the initial weight, when a food is placed on the tray, the elastic supporting piece is lowered by receiving the food weight via the motor axis of the motor assembly which supports the tray. Accordingly, the distance between the fixed electrode plate and the movable electrode plate is narrowed to increase the capacitance of a capacitor comprised of the fixed electrode plate and the movable electrode plate. Using a frequency variation due to the increase of the capacitance, a microcomputer senses the food weight.

By using the device for sensing food weight in the microwave oven according to the present invention, the initial weight of the food can be set using the overlapping area of the fixed electrode plate with the movable electrode plate. Further, since the initial weight is not changed, the weight of the food can be accurately measured to cook appropriately.

In addition, the PCB is not deformed nor destroyed after repeated usage of the device for sensing the food weight and the food weight is accurately delivered to the movable electrode plate.

BRIEF DESCRIPTION OF THE DRAWINGS

The above object and other advantages of the present invention will become more apparent by describing in detail a preferred embodiment thereof with reference to the attached drawings in which:

FIG. 4 is a cross-sectional view for showing the assembled state of the device in FIG. 2 with a housing of the microwave oven body.

DESCRIPTION OF THE PREFERRED EMBODIMENT

Figure 1:
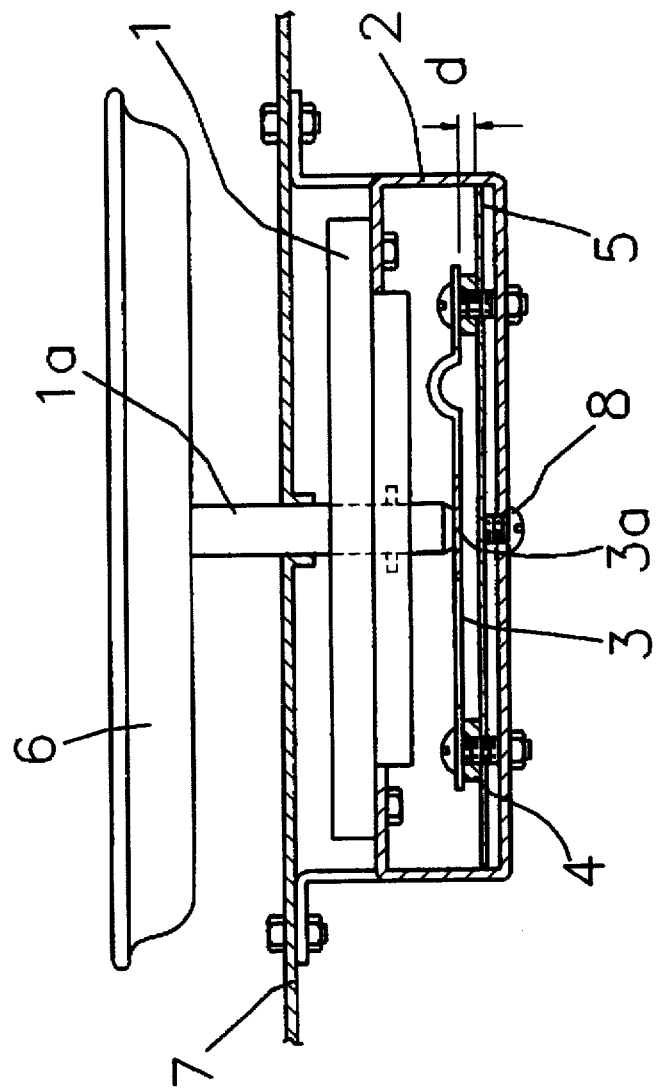
FIG. 1 is a cross-sectional view of the device for sensing food weight of a conventional microwave oven.

Referring to the attached drawings, a preferred embodiment of the present invention will be described below. In the attached drawings, the same reference numerals are given to the same components.

Figure 2:
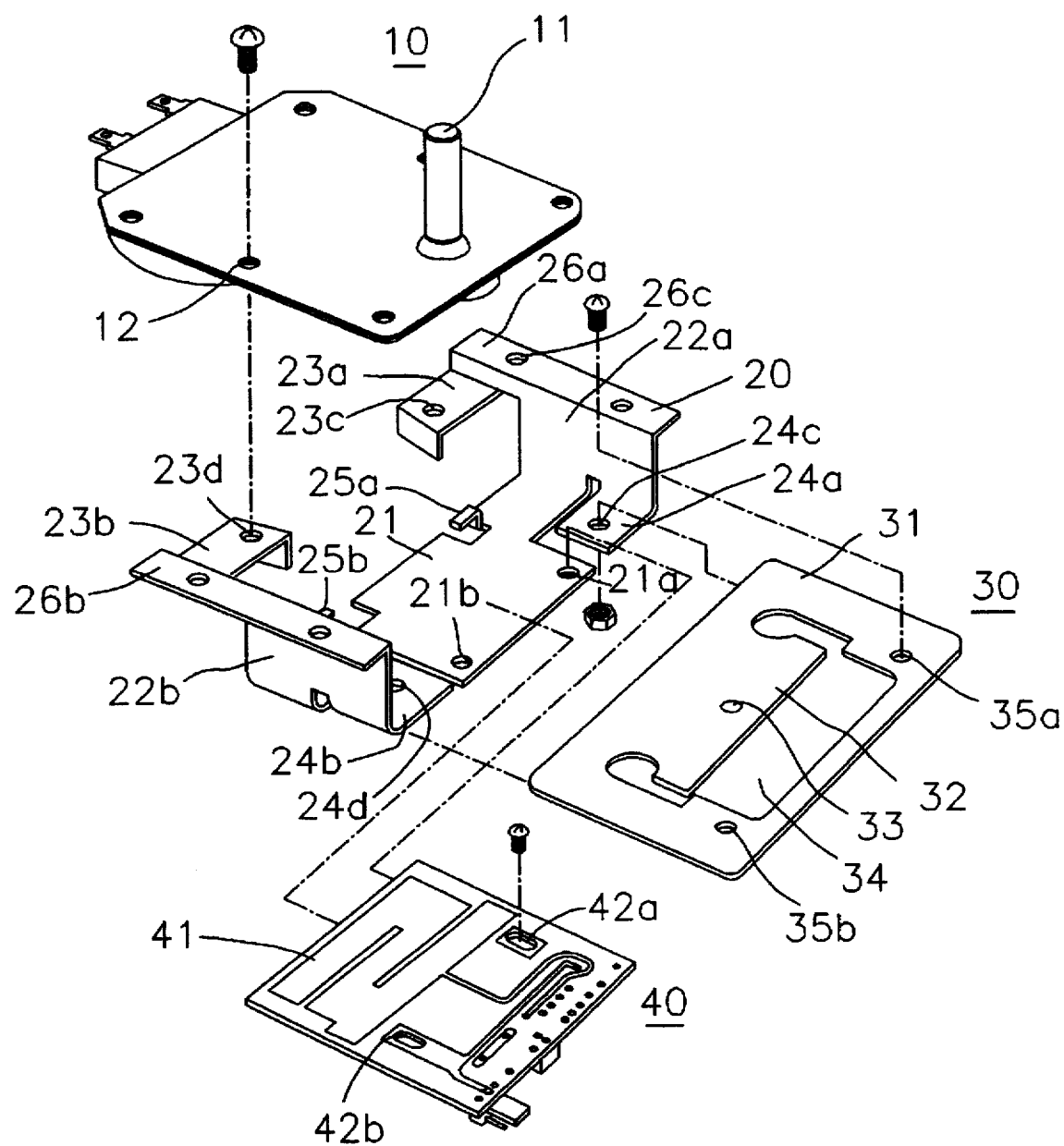
FIG. 2 is an exploded perspective view of a device for sensing food weight in the microwave oven according to a preferred embodiment of the present invention.

FIG. 2 is an exploded perspective view of a device according to a preferred embodiment of the present invention.

The device for sensing the food weight of the microwave oven according to the preferred embodiment of the present invention includes a bracket 20 having two side walls 22a and 22b and a bottom 21. The front and rear sides of bracket 20 are opened. A PCB 40 is mounted on bottom 21 of bracket 20, and a movable electrode plate 30 is fixed to second extending pieces 24a and 24b which are extended from side walls 22a and 22b of bracket 20.

Bracket 20 is integrally formed by bending side walls 22a and 22b of the bracket 20 from bottom 21. Shoulders 26a and 26b are bent and extended from the upper portion of side walls 22a and 22b of bracket 20. A plurality of first through holes 26c is formed in shoulders 26a and 26b. Bracket 20 is combined with housing 7 of the microwave oven body (see FIG. 4) by means of bolts through first holes 26c.

In addition, bracket 20 is provided with first extending pieces 23a and 23b on which motor assembly 10 is mounted. First extending pieces 23a and 23b are bent and extended from the rear and upper portion of side walls 22a and 22b of bracket 20. Motor assembly 10 is mounted on first extending pieces 23a and 23b by means of bolts through a sixth through hole 12 and second through holes 23c and 23d.

Second extending pieces 24a and 24b of bracket 20 are bent and extended from the front and lower portion of side walls 22a and 22b of bracket 20. Second extending pieces 24a and 24b are separated from bottom 21 of bracket 20 and are vertically higher than bottom 21. Third through holes 24c and 24d are formed in second extending pieces 24a and 24b.

Meanwhile, movable electrode plate 30 is provided with a body 31 and an elastic supporting piece 32 which is formed in a region between the center and the rear portions of body 31. An empty space 34 is formed between the front end of elastic supporting piece 32 and the front end of body 31. Elastic supporting piece 32 is separated from both sides of body 31 and from the front side of body 31. Elastic supporting piece 32 is elastically supported by the rear portion of body 31. A concavity 33 is formed at the front center portion of elastic supporting piece 32. The end portion of motor axis 11 of motor assembly 10 is inserted into concavity 33 of elastic supporting piece 32 and the food weight is transferred to elastic supporting piece 32 through motor axis 11 without sliding. Fifth through holes 35a and 35b are formed in both sides of body 31 of movable electrode plate 30. Movable electrode plate 30 is fixed to second extending pieces 24a and 24b of bracket 20 by coupling fifth through holes 35a and 35b and second extending pieces 24a and 24b by means of bolts. In the preferred embodiment of the present invention, the movable electrode plate is manufactured as a plate spring.

Bracket 20 is provided with a pair of guides 25a and 25b which guides PCB 40. The pair of guides 25a and 25b is bent and positioned at the rear portion of bottom 21. Fourth through holes 21a and 21b at which PCB 40 is fixed are formed in the front portions of bottom 21.

PCB 40 is provided with a fixed electrode plate 41 printed at the rear portion thereof and longitudinal holes 42a and 42b at both sides from the center portion thereof. PCB 40 is fixed to fourth through holes 21a and 21b in bottom 21 of bracket 20. Fixed electrode plate 41 and movable electrode plate 30 form a capacitor.

Processes for assembling the device for sensing the food weight in the microwave according to the preferred embodiment of the present invention and for setting the initial weight are as follows.

Figure 3:
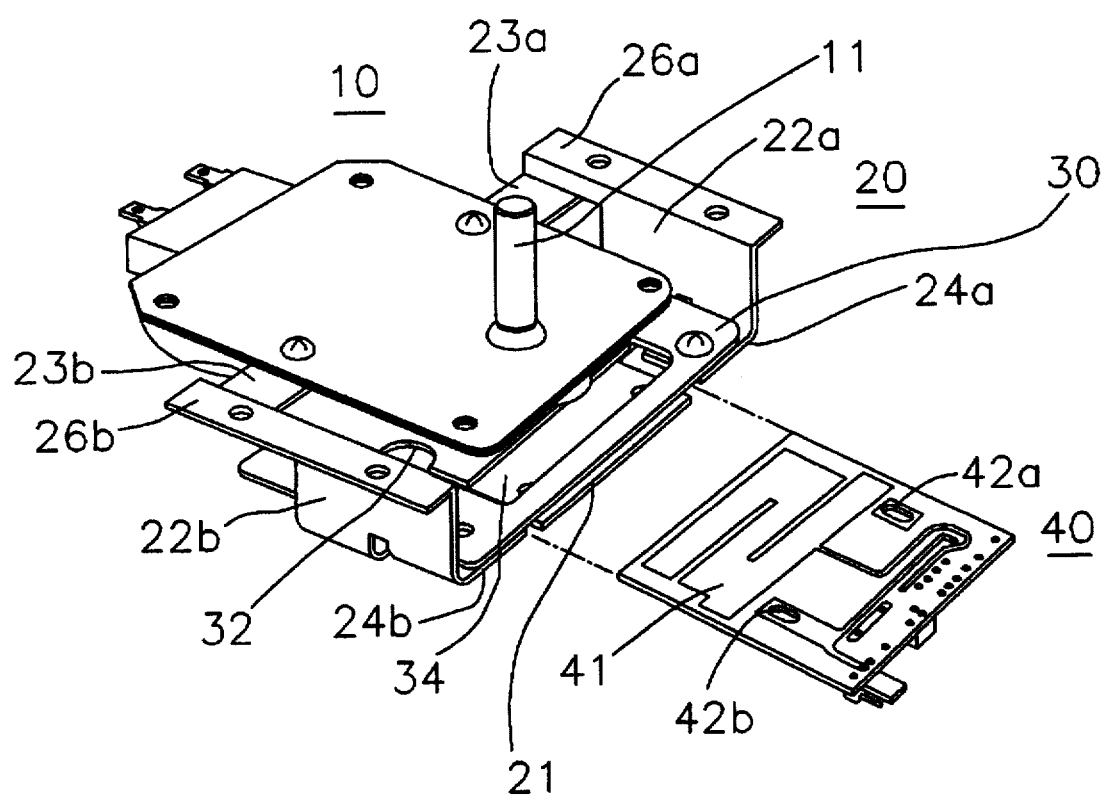
FIG. 3 is a perspective view of the device in FIG. 2, wherein the PCB is being inserted between the movable electrode plate and the bottom of the bracket for setting the initial weight.

FIG. 3 is a schematic view for explaining the assembling process and setting process of the initial weight in the device for sensing the food weight in the microwave according to the preferred embodiment of the present invention.

Firstly, motor assembly 10 is mounted on first extending pieces 23a and 23b of bracket 20. Then, movable electrode plate 30 is fixed to second extending pieces 21a and 21b of bracket 20 by means of bolts. At this state, PCB 40 is guided by the pair of guides 25a and 25b of bracket 20 and is slidably inserted into a space formed between movable electrode plate 30 and bottom 21 of bracket 20. Bolts are inserted into the longitudinal holes 42a and 42b of PCB 40 which has been slidably inserted into the space formed between movable electrode plate 30 and bottom 21 of bracket 20, and fourth through holes 21a and 21b.

If PCB 40 slides back and forth centering around the bolt inserted into longitudinal holes 42a and 42b, the overlapping area A is changed. When the overlapping area A is changed in this way, the capacitance C of the capacitor also is changed as shown in equation (1). Therefore, after adjusting the overlapping area A so that the initial weight becomes zero, the bolts inserted into longitudinal holes 42a and 42b are tightened to fix PCB 40 to bracket 20. Now the initial weight setting is completed. After setting the initial weight, the device is coupled with housing 7 of the microwave oven body using shoulders 26a and 26b of bracket 20 as shown in FIG. 4.

FIG. 4 is a cross-sectional view for showing the combined state of housing 7 of the body with the device according to the preferred embodiment of the present invention.

As shown in FIG. 4, when a food (not shown) is placed on tray 6, elastic supporting piece 32 is lowered by motor axis 11 of motor assembly 10 which supports tray 6. As elastic supporting piece 32 is lowered, the distance between fixed electrode plate 41 and movable electrode plate 30 is narrowed and the capacitance C between the two electrode plates 30 and 41 is increased as can be seen from equation (1). The increased capacitance C changes the frequency of the high frequency and the microcomputer senses this change to read the food weight from the previously prepared look-up table. The food cooking is controlled by the microcomputer.

Further, when the distance between fixed electrode plate 41 and movable electrode plate 30 is changed to alter the capacitance of the capacitor consisting of fixed electrode plate 41 and movable electrode plate 38 after repeated use of the microwave oven, the initial weight deviates from zero. At this time, the initial weight needs to be reset by changing the overlapping area of fixed electrode plate 41 and movable electrode plate 38. In such a case, the initial weight of the device for sensing the food weight in a microwave oven can be easily reset by slightly sliding backwards or forwards PCB 40 which is slidably fixed to bracket 20. Thus, resetting of the initial weight may be easily performed.

The initial weight of the food can be set by means of the overlapping area of the fixed electrode plate with the movable electrode plate in the device for sensing the food weight of the microwave oven according to the present invention. Since the fixed electrode plate and the movable electrode plate is separated and fixed, the initial distance between the two electrodes is constant, and the initial weight is not changed.

In addition, in the device for sensing the food weight of the microwave oven according to the present invention, deformation or destruction of the PCB after repeated use could be prevented. Further, since the food weight is accurately delivered to the movable electrode plate, the food weight could be accurately sensed.

Accordingly, an effect of an appropriate cooking could be accomplished through the accurate sensing of the food weight in the device for sensing the food weight of the microwave oven according to the present invention.

The present invention was described in the above based on the preferred embodiment, and the present invention is not limited to the preferred embodiment, but various changes and modifications can be added without departing from the scope of the present invention.

What is claimed is:

1. A device for sensing food weight in a microwave oven, said device comprising:

a bracket provided with two side walls and a bottom, a front side and a rear side of said bracket being opened;

a motor assembly having a motor axis for supporting and rotating a tray for placing a food, said motor assembly being mounted on said bracket;

a movable electrode plate fixed to said bracket below said motor assembly to be in contact with said motor axis, said movable electrode plate having an elastic supporting piece which descends by a lowering force due to a weight of said food; and a fixed electrode plate printed in a rear portion of a printed circuit board, said printed circuit board being insertedly mounted between the movable electrode plate and the bottom of said bracket capable of adjusting an inserting distance of said printed circuit board and fixed to the bottom of said bracket, wherein the adjustment of the inserting distance causes a change of an overlapping area between said movable electrode plate and said fixed electrode plate to set an initial value of weight, wherein said bracket is provided with second extending pieces extended from front and lower portions of said side walls, said second extending pieces are vertically higher than the bottom of said bracket, and said movable electrode plate is fixed to said second extending pieces, whereby said device senses the food weight according to a varied distance between said movable electrode and said fixed electrode.

2. A device for sensing food weight in a microwave oven as claimed in claim 1, wherein said bracket is provided with first extending pieces extended from upper and rear portions of both side walls of said bracket, and said motor assembly is mounted on said first extending pieces.

3. A device for sensing food weight in a microwave oven as claimed in claim 1, wherein said bracket is provided with guides bent at a rear portion of said bottom, for guiding said printed circuit board.

4. A device for sensing food weight in a microwave oven as claimed in claim 1, wherein said bracket is provided with shoulders extended from upper portions of said side walls of said bracket and a housing of a microwave body is combined with said shoulders.

5. A device for sensing food weight in a microwave oven as claimed in claim 1, wherein said movable electrode plate is provided with a body and said elastic supporting piece formed in a region from a center portion to a rear portion of said body, said elastic supporting piece is separated from both sides and a front of said body and is elastically supported by the rear portion of said body, and a concavity is formed at a front portion of said elastic supporting piece to position a terminal end of said motor axis therein.

6. A device for sensing food weight in a microwave oven as claimed in claim 1, wherein said printed circuit board is provided with longitudinal holes at both sides from a center thereof and is fixed to said bracket by fasteners inserted in the longitudinal holes, and the inserting distance of said printed circuit board is adjustable by the length of the longitudinal holes.

7. A device for sensing food weight in a microwave oven comprising:

a bracket provided with both side walls, a bottom connected with said side walls, first extending pieces extended from rear and upper portions of said side walls, second extending pieces extended from front and lower portions of said side walls, shoulders extended from upper portions of said side walls, and guides bent from a rear portion of said bottom, said second extending pieces being separated from said bottom and vertically higher than said bottom;

a motor assembly having a motor axis for supporting and rotating a tray for placing food, said motor assembly being mounted on said first extending pieces;

a movable electrode plate provided with a body and an elastic supporting piece formed in a region from the center to a rear portion of said body, said elastic supporting piece being separated from a front and both sides of said body and elastically supported by the rear portion of said body, said elastic supporting piece having a concavity formed at a front portion and said movable electrode plate being fixed to said second extending pieces, said elastic supporting piece descending by a lowering force due to the weight of the food; and a print circuit board provided with a fixed electrode at a rear portion thereof and longitudinal holes at both sides thereof, said printed circuit board being guided by said guides of said bracket and slidably inserted between said bottom of said bracket and said movable electrode plate to set an initial weight;

whereby the initial weight is set by adjusting an overlapping area by sliding said fixed electrode plate so that said device senses the food weight according to varied distance between said movable electrode and said fixed electrode.

8. A device for sensing food weight in a microwave oven as claimed in claim 7, wherein said bracket is formed into one body.

9. A device for sensing food weight in a microwave oven as claimed in claim 7, wherein said movable electrode plate is formed so as to have a plate spring shape.

10. A device for sensing food weight in a microwave oven as claimed in claim 7, wherein the end portion of said motor axis is inserted into said concavity of said elastic supporting piece in said movable electrode plate.

11. A device for sensing food weight in a microwave oven comprising:

a bracket provided with both side walls, a bottom connected with said side walls, first extending pieces extended from rear and upper portions of said side walls, second extending pieces extended from front and lower portions of said side walls, shoulders extended from upper portions of said side walls and guides bent from a rear portion of said bottom, said bracket being formed into one body, said second extending pieces being separated from said bottom and vertically higher than said bottom;

a motor assembly having a motor axis for supporting and rotating a tray for placing a food, said motor assembly being mounted on said first extending pieces;

a movable electrode plate having a plate spring shape, said movable electrode plate being provided with a body and an elastic supporting piece formed in a region from a center to a rear portion of said body, said elastic supporting piece being separated from a front and both sides of said body and elastically supported by the rear portion of said body, said elastic supporting piece being provided with a concavity for inserting the end portion of said motor axis formed at front portion thereof and fixed to said second extending pieces; and a print circuit board provided with a fixed electrode at a rear portion of said printed circuit board and longitudinal holes at both sides thereof, said printed circuit board being guided by said guides of said bracket and slidably inserted between said bottom of said bracket and said movable electrode plate to set an initial weight;

whereby the initial weight is set by sliding said printed circuit board to adjust an overlapping area between said movable electrode plate and said fixed electrode plate so that said device senses the food weight according to a varied distance between said movable electrode and said fixed electrode.

* * * * *